Feb. 6, 1940.   M. G. BOERGER   2,189,540
SEAM SOLDERING MACHINE FOR RADIATOR HEADERS
Filed March 24, 1938   5 Sheets-Sheet 1

Inventor:
Martin G. Boerger,
By: Hill & Hill Attys

Feb. 6, 1940.    M. G. BOERGER    2,189,540
SEAM SOLDERING MACHINE FOR RADIATOR HEADERS
Filed March 24, 1938    5 Sheets-Sheet 3

Inventor:
Martin G. Boerger
By: Hill & Hill
Attys

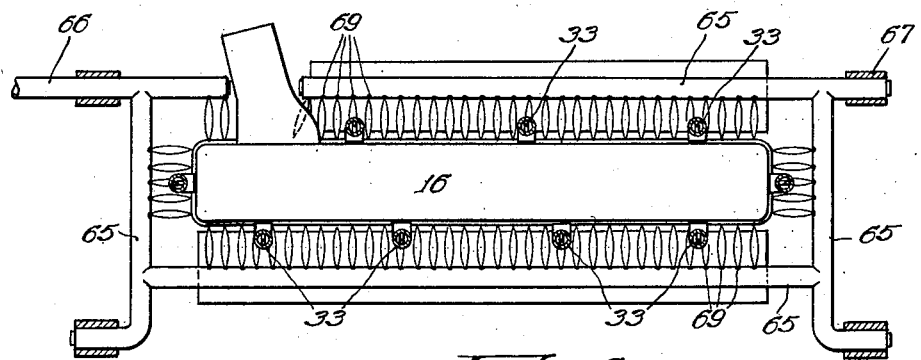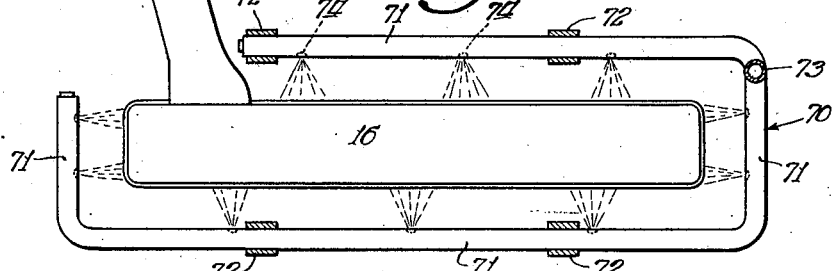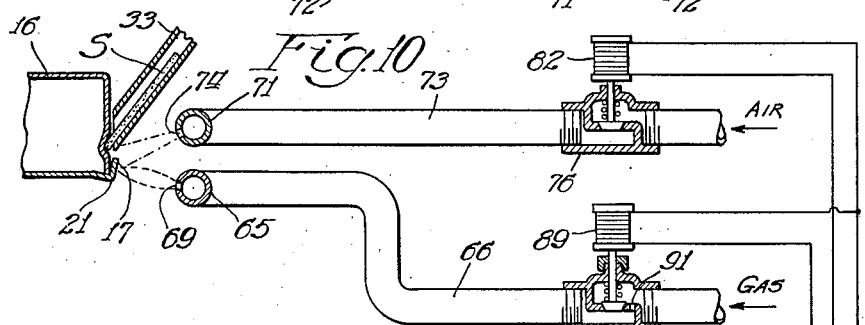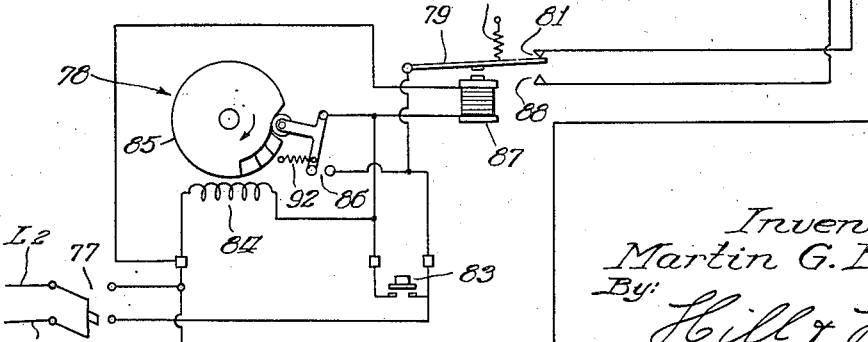

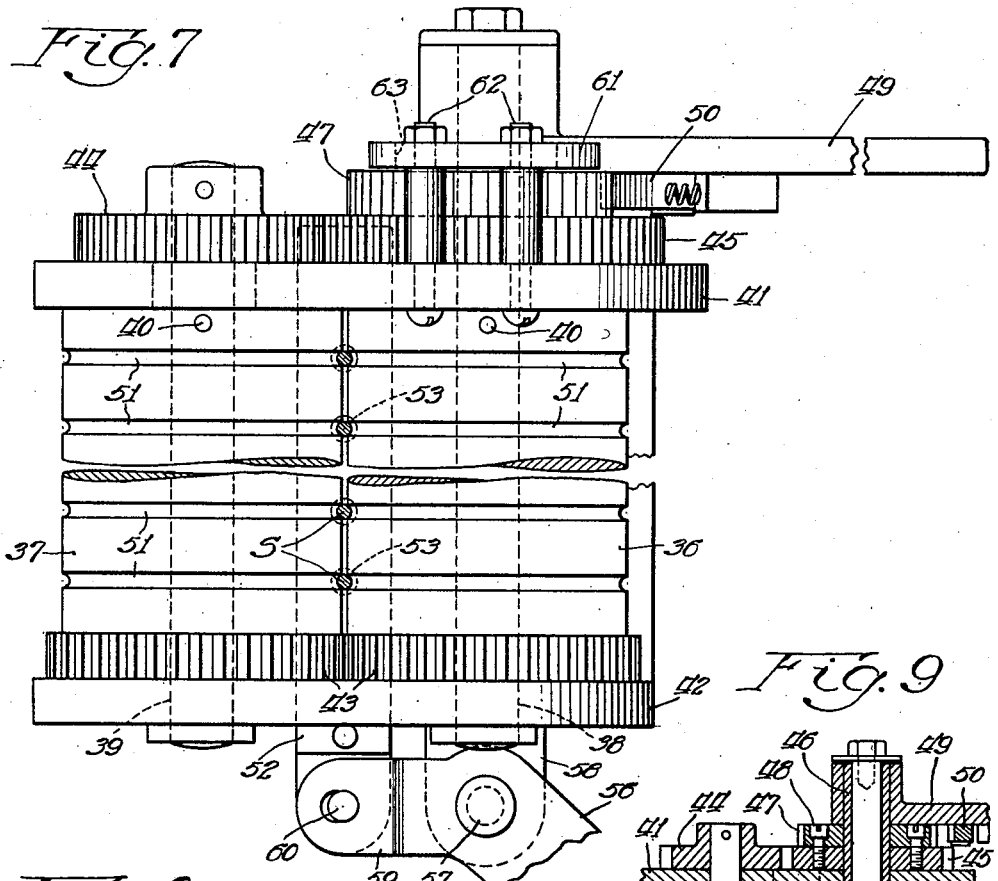
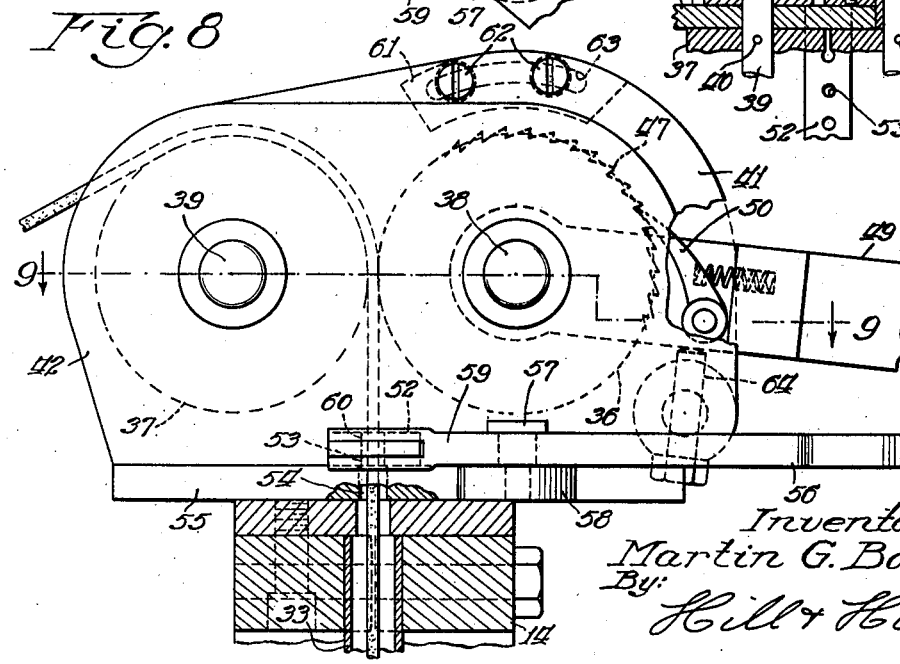

Patented Feb. 6, 1940

2,189,540

UNITED STATES PATENT OFFICE 2,189,540

SEAM SOLDERING MACHINE FOR RADIATOR HEADERS

Martin G. Boerger, Racine, Wis., assignor to Modine Manufacturing Company, Racine, Wis., a corporation of Wisconsin Application March 24, 1938, Serial No. 197,832

6 Claims. (Cl. 113—59)

This invention relates to soldering machines, and particularly to machines for soldering the component parts of radiator core headers to provide a water-tight connection at the juncture of said parts.

These parts, in the present instance, comprise a box-like head having an open side portion and a header plate adapted to close the open side of the head and to be secured thereto in a manner to provide a fluid-tight connection, the plate being permanently secured to a plurality of fluid conducting tubes forming a part of the radiator core.

One object of the present invention is to provide a novel construction and arrangement for producing uniformity in the soldered joint at the juncture of the component parts of the header.

Another object of the invention is to provide means for uniformly and simultaneously heating the entire area to be bonded with solder, thereby preventing local expansion.

Another object of the invention is to provide a novel arrangement for maintaining the parts of the header in close contact or engagement during the soldering operation.

Another object of the invention is to provide a machine wherein the solder is fed substantially uniformly to adjacent the juncture of the header parts, and wherein means are provided whereby the soldering operation is performed simultaneously on all sides of the header.

Another object of the invention is to provide novel means for feeding the solder to the machine and to adjacent the juncture of the header parts in a manner to facilitate handling of the solder.

Another object of the invention is to provide a soldering machine of increased capacity, or in other words, wherein the completion of the soldering operation may be speeded up, thereby increasing production of the machine.

Another object of the invention is to provide a machine having cooling means associated therewith for assisting in completion of the soldering operation.

A further object of the invention is to provide a novel construction and arrangement including a timing device and electrical circuits operatively related thereto for controlling the operation of the soldering heat and cooling device embodied in the machine.

A still further object of the invention is to improve machines of the character described in sundry details hereinafter referred to and particularly pointed out in the appended claims.

One embodiment of the present invention is shown for illustrative purposes in the accompanying drawings, in which:

Fig. 5 is an enlarged plan sectional view taken substantially as indicated by the line 5—5 of Fig. 1, illustrating the arrangement of the heating means or unit in relation to the bottom radiator header;

Fig. 6 is an enlarged plan sectional view taken substantially as indicated by the line 6—6 of Fig. 1, illustrating the arrangement of the cooling means or unit in its relation to the bottom radiator header;

Fig. 7 is an enlarged plan view of the solder feeding mechanism illustrated in Figs. 1 and 2;

Fig. 8 is an end or side elevational view of the structure illustrated in Fig. 7;

Fig. 9 is a fragmentary plan sectional view of a portion of the structure illustrated in Figs. 7 and 8, and taken substantially as indicated by the line 9—9 of Fig. 8; and Fig. 10 is a circuit diagram illustrating the heating and cooling units in relation to a fragment of a radiator header, and also the electrical circuits for controlling the operation thereof by means of a timing device diagrammatically illustrated in Fig. 10.

Figure 1:
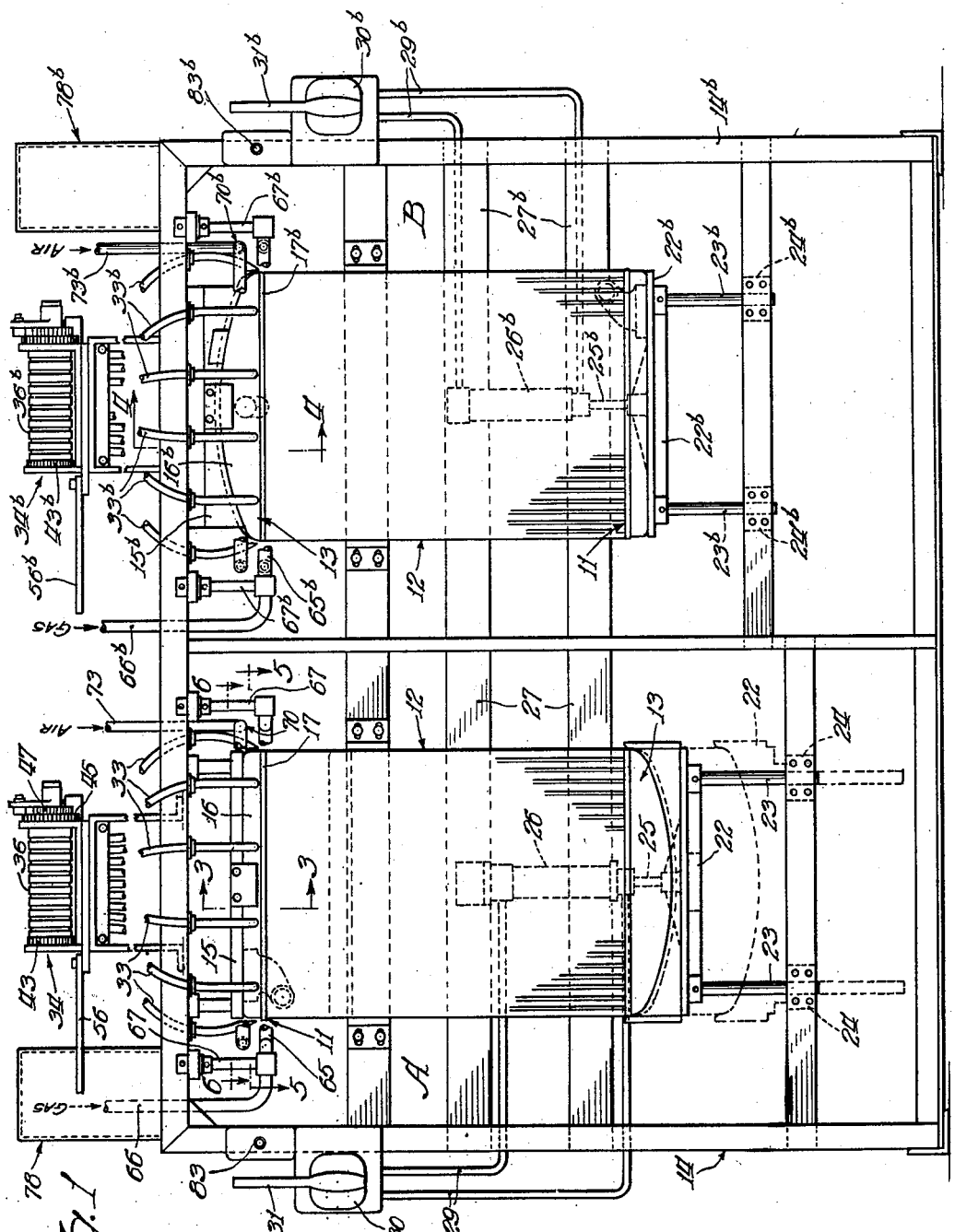
Fig. 1 is a front elevational view of a pair of units for soldering the bottom and top header portions, respectively, of a radiator core, a portion of the structure adjacent its upper part being broken away to facilitate the showing of other portions of the structure.

Fig. 1 of the drawings illustrates a pair of units of substantially like construction, and indicated, respectively, by the characters A and B, the construction and arrangement of the former being designed for handling and soldering the bottom header 11 of a radiator core indicated, as a whole, by the numeral 12, while the unit B is constructed and arranged for handling and soldering the top header indicated, as a whole, by the numeral 13, of the core 12.

As stated, these units are of substantially like construction, and are adapted to function in substantially like manner, except for slight variations in adapting the unit for treatment and soldering of the respective bottom and top header portions of the radiator core.

For convenience, the unit A will be described more in detail, and in the construction and arrangement shown, comprises a frame indicated, as a whole, by the numeral 14 having a holder 15 adjacent its upper end portion adapted to receive the lower header indicated, as a whole, by the numeral 11 of the radiator core 12, the header 11 being shown, in the present instance, as comprising a box-like head 16 having an open side portion, and a header plate 17 rigidly secured to fluid conducting tubes 18 of the radiator core 12, and having a flange 19 adjacent its edge portion forming a continuous marginal channel or groove 21 adapted to receive the edge portion of the box-like head 16, as clearly illustrated in Fig. 3.

For moving the bottom header 11 of the radiator core structure into position in the holder 15, a lifting table, cradle or elevator 22 is movably mounted on the frame 14 and guided by means of rods 23 slidably mounted in guide brackets 24 secured to the frame 14, the cradle 22 being suitably formed to receive the upper or top header 13 when the radiator core is in inverted position, as illustrated in Fig. 1.

For raising the elevator or cradle 22, a rod 25 is secured to the elevator 22 and extends upwardly into a cylinder 26 mounted on cross bars 27 of the frame member 14, the inner end of the rod 25 being provided with a piston 28 slidably mounted in the cylinder 26.

Suitably connected adjacent one of their respective end portions to the respective upper and lower end portions of the cylinder 26 at opposite sides of the piston 28 are a pair of air conduits 29 communicating at their opposite end portions with suitable control valve mechanism 30 of desired construction operable by means of a hand lever 31 for admitting air under pressure to either of the conduits 29 and to the upper or lower end portions of the cylinder 26 for raising and lowering the elevator or cradle 22, the control mechanism 30 being connected with a suitable source of air pressure supply by means of a pipe 32 for supplying air to the control mechanism 30 and cylinder 26.

Figure 2:
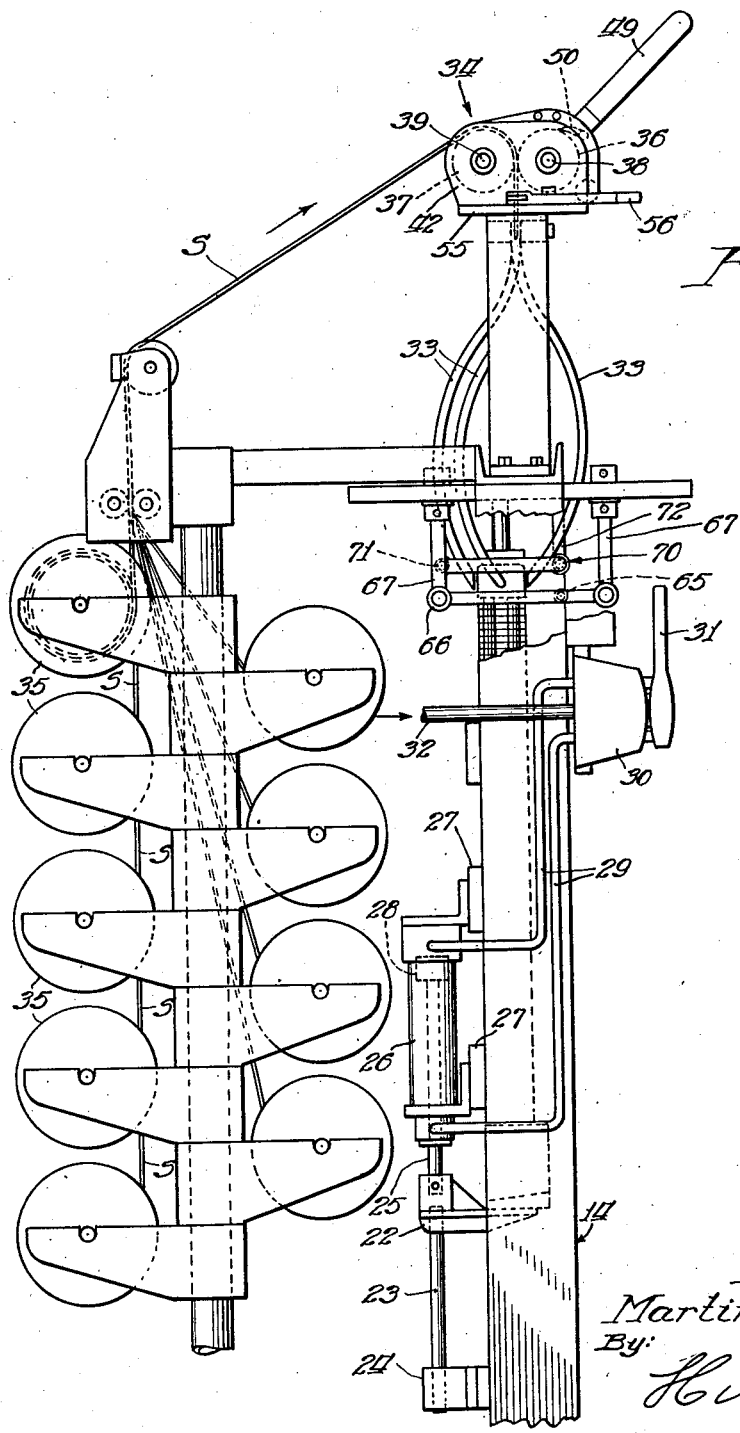
Fig. 2 is an enlarged side elevational view of a portion of the structure illustrated in Fig. 1 and taken as viewed from the left side thereof.
Figure 3:
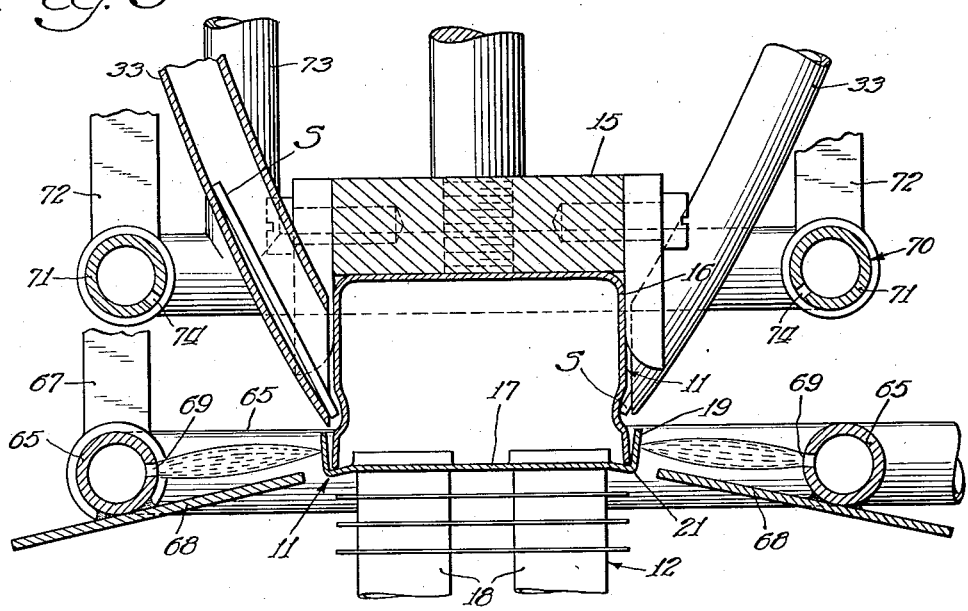
Fig. 3 is a further enlarged fragmentary transverse sectional elevational view of the structure illustrated in Fig. 1, and taken substantially as indicated by the line 3—3 thereof.
Figure 4:
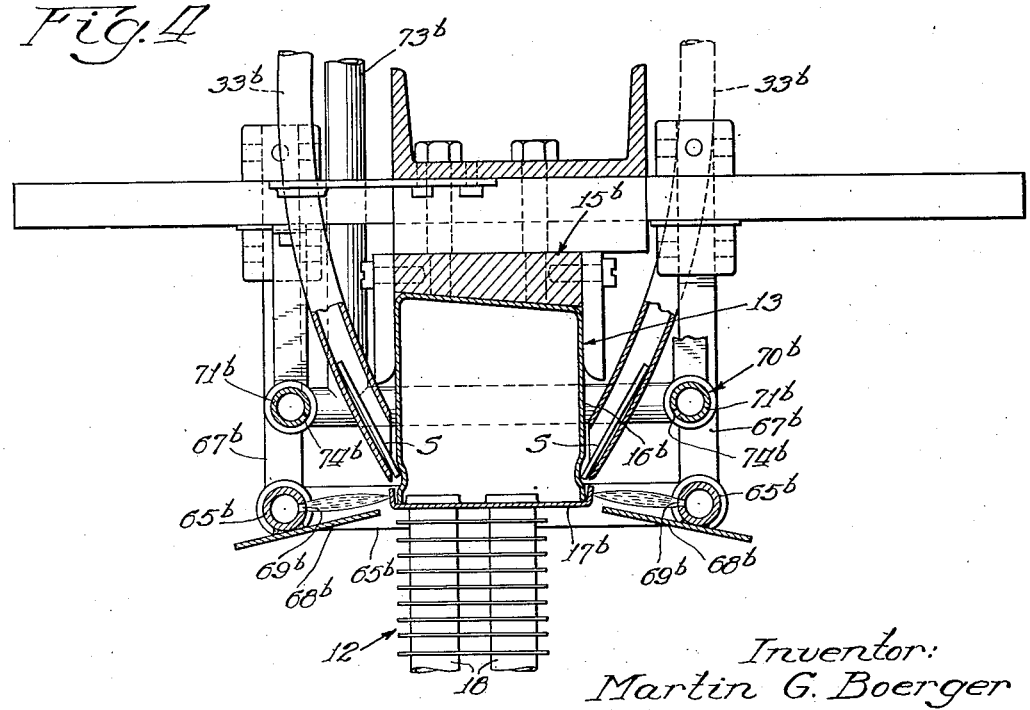
Fig. 4 is an enlarged fragmentary transverse sectional elevational view of a portion of the structure illustrated in Fig. 1, and taken substantially as indicated by the line 4—4 thereof, Fig. 4 being on a somewhat smaller scale than Fig. 3.

By such an arrangement, it will be apparent that by placing an inverted radiator core 12 with the upper header 13 on the cradle 22 and admitting air to the lower end of the cylinder 26 through the operation of the hand lever 31, the elevator or cradle 22 will be raised to move the bottom header 11 into position in the holder 15 and the engaging portions of the component parts 16 and 17 of the header in close contact, as illustrated in Figs. 1, 2, and 3, and retain the header and parts thereof in such position during the soldering operation.

For supplying solder to the juncture of the component parts 16 and 17 of the header 11, a plurality of guides 33 shown, in the present instance, as of tubular form, are suitably mounted on the frame 14 and have their lower end portions terminating adjacent the respective sides of the header and the juncture of the parts 16 and 17 thereof, as clearly illustrated in Fig. 3, the opposite or upper end portions of the tubular guides being positioned adjacent a solder feed mechanism shown in detail in Figs. 7, 8, and 9, and indicated, as a whole, by the numeral 34 mounted on the frame 14 and adapted to feed a plurality of strands of wire solder S from the reels or spools 35 to the respective tubes 33.

The solder feed mechanism shown, in the present instance, comprises a pair of rotatable feed rolls 36 and 37 (Figs. 7 and 8), secured to shafts 38 and 39, respectively, by means of pins 40, the shafts 38 and 39 being rotatably mounted in frame members 41 and 42, the rolls 36 and 37 being connected together for rotation in opposite directions by means of a pair of spur gears 43 secured to the respective feed rolls 36 and 37.

For driving the rolls 36 and 37, the shaft 38 is provided with a pinion 44 adapted to mesh with a pinion 45, preferably, of slightly larger diameter rotatably mounted on a sleeve 46 (Fig. 9) and about the axis of the shaft 38, the pinion 45 having a ratchet 47 secured to one side thereof by means of bolts 48 (Fig. 9). Loosely mounted on the sleeve 46 and rotatable to swing about the axis of the shaft 38 is a hand lever 49 having a pawl or dog 50 mounted on one side thereof adapted to engage the ratchet 47 and rotate the ratchet gearing and feed rolls 36 and 37 when the hand lever 49 is swung in an upward direction for feeding the strands of wire solder S downwardly between the feed rolls 36 and 37, the respective feed rolls being provided with a plurality of longitudinally spaced circumferential grooves or channels 51 adapted to cooperate for suitable engagement with the strands of wire solder, as clearly illustrated in Fig. 7.

Positioned below the adjacent faces of the respective feed rolls 36 and 37 is a cutter bar or knife member 52 having a plurality of spaced apertures 53 formed therein adapted to register with apertures 54 formed in the base 55 of the frame members 41 and 42, and positioned immediately above and in substantial alignment with the upper open end portion of the tubular guides 33, and through which the respective strands of wire solder S are adapted to pass into the upper or receiving end of the tubular guides, the cutter bar 52 being adapted to be reciprocated by means of a hand lever 56 pivotally mounted at 57 on a bracket 58 secured to the frame member 42 and provided with an arm 59 connected at 60 to one end of the cutter bar 52, whereby through oscillation of the hand lever 56 about its pivot 57, the cutter bar will be reciprocated to sever portions of the respective strands of wire solder S projecting into the respective tubular guides 33, through which they are directed by gravity to adjacent the respective sides of the header and the juncture between the component parts 16 and 17 thereof, as illustrated in Fig. 3.

For varying the degree of movement of the hand lever 49 of the solder feed mechanism 34 to determine the amount of solder to be fed by the feed rolls 36 and 37, a stop member 61 is mounted on the frame member 41 by means of studs 62 and is provided with a slot 63 for receiving the studs 62, thereby providing a structure whereby the stop 61 may be secured in various positions with respect to the studs in a manner to determine the limit of upward movement of the hand lever 49, and for determining the limit of downward movement of the hand lever 49, an adjusting screw 64 is suitably positioned in a portion of the frame member 41 beneath the lever 49, as clearly illustrated in Fig. 8. Thus, it will be seen that by such an arrangement, the effective throw of the hand lever 49 may be varied within a substantial range for determining the amount of solder to be fed by the rolls 36 and 37 and to be cut off by the cutter bar 52 for supplying the desired amount of solder for effectively securing the component parts of the radiator core header together.

For applying heat to the juncture of the parts of the header, and for fusing the portions of solder contained in the respective tubular guides 33, a plurality of gas burners 65 are positioned on the respective sides of the header and adapted to be connected to a suitable source of gas supply by means of a pipe 66, as illustrated in Figs. 1, 3, and 5, and supported, preferably from the frame 14 by means of hangers 67, the burners 65 being provided adjacent their under sides with wind deflectors or shields 68, and along their inner sides with a plurality of spaced jets 69 for directing jets of flame toward and against the juncture of the header parts, as illustrated in Figs. 3 and 5 for fusing the portions of wire solder in the guides 33 to permit the solder to flow around the channel 21 in a manner to secure the component parts 16 and 17 of the header together, after which the supply of gas to the burners 65 is reduced to the extent of maintaining merely a pilot flame at the jets to insure a jet of flame against the header when the gas is again turned on for a succeeding soldering operation.

For cooling the soldered joint at the juncture of the parts 16 and 17 of the header, an air conduit 70 having branches 71 positioned on the respective sides of the header and supported, preferably, from the frame 14 by hangers 72, is connected by means of a supply pipe 73 with a suitable source of air pressure, and the portions or branches 71 of the conduit 70 on the respective sides of the header are provided with outlets 74 for directing streams of cool air against the soldered joint for quickly cooling and setting the solder so that the radiator core may be removed and an unsoldered header positioned in the holder 15 for a succeeding soldering operation. By such an arrangement, it will be apparent that the cooling of the soldered joint is accelerated to permit quick removal of the soldered header, thereby increasing the speed at which a complete soldering operation may be performed and the output of the machine increased correspondingly.

For controlling the passage of gas and air through the gas and air supply pipes 66 and 73, respectively, these pipes are provided, respectively, with solenoid operated valves 75 and 76 (Fig. 10) operatively and electrically connected to line wires L1 and L2 through a switch 77, and controlled through the operation of a timing device of suitable and well-known construction indicated, as a whole, by the numeral 78, diagrammatically shown in Fig. 10, and suitably positioned on the frame 14, as illustrated in Fig. 1.

As the particular mechanism of the timing device forms no part of the present invention, the mechanism is shown only diagrammatically in Fig. 10, and in its relation to certain control devices illustrated therein, the form of timing device preferred being of a type wherein the cycle or duration of operation may be varied to suit conditions which may be found to exist in the operation of the soldering machine.

As diagrammatically illustrated in Fig. 10, the closing of the switch 77 will serve to complete a circuit through an arm 79 and contact point 81 to energize the solenoid 82 and open the valve 76 to permit the passage of air therethrough to the air conduit 70 and outlets 74 thereof.

In operation, a radiator core in inverted position is placed on the elevator, or cradle 22 while in the dotted line position shown in Fig. 1, and through the manipulation of the hand lever 31 to admit air into the lower portion of the cylinder 26, the elevator is raised to the full-line position shown in Fig. 1 in a manner to move the bottom header 11 of the core 12 into the holder 15 in a manner to retain the component parts of the header in close contact with each other, and in operative position with respect to the burner 65. Then, by actuating the hand lever 49 of the solder feed mechanism 34, the strands of wire solder S are drawn from the spools 35 to feed the leading end portions of the wire solder into the guide tubes 33 a distance depending upon the position of the stops 61 and 64 of the solder feed mechanism, and by manipulating the hand lever 55, the cutter bar 53 is shifted to sever portions of the strands of wire solder and permit these portions to pass downwardly through the guides 33 to adjacent the side portions of the header, and to adjacent the juncture between the parts 16 and 17 thereof, as clearly illustrated in Fig. 3.

Assuming that the switch 77 is closed, the operator will manipulate a normally open push-button switch 83 (Figs. 1 and 10), to energize a motor coil 84 of the timing device 78 causing the cam 85 thereof to be rotated in a manner to close a switch 86 and maintain the switch 86 in closed condition throughout a complete rotation of the cam 85.

The closing of the switch 86 serves to energize a magnet 87 to draw the arm 79 into engagement with a contact point 88 thereby breaking the circuit through the air valve solenoid 82, and energizing a solenoid 89 to open the gas valve 75, and admit gas to the burners 65 in sufficient quantities to project a plurality of flame jets against the side of the header adjacent the juncture of the parts thereof to melt the portions of solder in the tubes 33 so that the solder may flow around the channel 21 formed at the adjacent portions of the header parts, and provide a uniform distribution of solder throughout the length of the joint, it being understood, as previously stated, that through a by-pass 91 of the valve 75, for example, sufficient gas is supplied to the jets 69 between soldering operations to maintain a pilot flame.

The motor coil 84 will remain energized during the soldering operation due to the energizing of the circuit of the magnet 87, and upon completion of a cycle of the cam 85, a spring 92 serves to open the switch 86, a de-energize the magnet 87, and permit a spring 93 to move the arm 79 into engagement with the contact 81, thereby substantially simultaneously de-energizing the solenoid 89 and energizing the solenoid 82 to permit the passage of air through the valve 76, conduit 73 and outlets 74 for projecting a blast of cool air against the solder joint for quickly cooling and setting the solder.

After the soldering operation on the bottom header 11 is completed, the hand lever 31 of the air control device 30 is again manipulated to admit air to the upper portion of the cylinder 26 to move the elevator 22 and radiator core 12 downwardly to the dotted line position shown in Fig. 1, whereupon the core may be removed, turned end for end, and positioned on an elevator 22b of the unit B for moving the top header 13, comprising a box-like head 16b and header plate 17b, into a holder 15b to position the top header with respect to solder handling and heating apparatus similar to that described with reference to the unit A.

As previously stated, these units A and B are of substantially like construction, and for convenience, the corresponding parts of the unit B are identified in the drawings by corresponding numbers bearing the exponent b, practically the only difference in the construction of the two units being in the cradle or elevator formations and the form of the holders 15 and 15b to accommodate the particular form of the bottom and top headers 11 and 13, respectively of the radiator core 12.

Obviously, the gas supply pipes 66 and 66b and the air supply pipes 73 and 73b of the respective units may be connected, respectively, with common sources of gas and air supply inasmuch as the respective units are independently actuated through independently operated mechanism including timing devices and circuits of the character illustrated in Fig. 10 and described with reference to the unit A.

It will be observed from the foregoing description and operation that the present invention provides a novel construction and arrangement for uniformly and simultaneously heating the entire area to be bonded with solder, thereby preventing local expansion and providing a uniform watertight connection at the juncture of component parts of the headers of a radiator core, and also provides novel means for feeding solder to the machine in suitable quantities to provide an efficient connection.

The present invention also provides a novel arrangement for maintaining the component parts of the headers in close contact or engagement during the soldering operation, and by providing cooling means, automatically and operatively related to the heating device, serves to materially assist in completing the soldering operation, thereby speeding up and increasing production of the machine.

Obviously, the present invention is not limited to the precise construction and arrangement shown and described as the same may be variously modified. Moreover, all the features of the invention need not be used conjointly as the same may be used to advantage in variously different combinations and sub-combinations.

What I claim as new and desire to secure by Letters Patent is:

1. In a machine for soldering the juncture of component parts of a radiator core header, a frame, a holder mounted thereon, vertically movable pressure means providing a radiator support for moving the radiator core into position in said holder and pressing the parts of the header together, a plurality of guides substantially uniformly spaced around and at the respective sides and ends of said header and terminating adjacent the header for directing portions of solder against the sides thereof adjacent the juncture of said parts, means for supplying solder to said guides, a plurality of intermittently operated heaters at the respective sides of said header for heating the sides thereof adjacent the juncture of said parts, and a plurality of means on the respective sides and ends of the header and operative alternately with said heaters for directing currents of cool air against the juncture of said parts.

2. In a machine for soldering the juncture of component parts of a radiator core header, a frame, a holder mounted thereon, pressure operated means for moving a radiator core into position in said holder and pressing the parts of the header together, a plurality of guides at the respective sides of said header and terminating adjacent the header for directing portions of solder against the sides thereof adjacent the juncture of said parts, means for supplying solder to said guides, a plurality of heaters at the respective sides and ends of said header for simultaneously and uniformly heating the sides and ends thereof adjacent and throughout the juncture of said parts, and a plurality of means on the respective sides and ends operating alternately with said heaters for directing currents of cool air against the juncture of said header parts.

3. In a machine for soldering the juncture of component parts of a radiator core header, a frame, a holder mounted thereon, pressure operated means for moving a radiator core into position in said holder and pressing the parts of the header together, a plurality of guides at the respective sides of said header and terminating adjacent the header for directing portions of solder against the sides thereof adjacent the juncture of said parts, means for supplying solder to said guides, a plurality of heaters at the respective sides of said header for heating the sides thereof adjacent the juncture of said parts, means for directing currents of cool air against the juncture of said header parts and a timing device operatively related to said heaters and cooling means for alternately controlling the operation thereof.

4. In a machine for soldering the juncture of component parts of a radiator core header, a frame, a holder mounted thereon, pressure operated means for moving a radiator core header into position in said holder and pressing the parts of the header together, means for feeding a plurality of strands of wire solder to said machine, a cutter operatively related to said feeding means for severing portions from the respective strands of said wire solder, a plurality of guides operatively related to said cutter for receiving the respective portions of solder cut from said strands and directing said portions by gravity to the respective sides and ends of said header adjacent the juncture of the parts thereof, a plurality of heaters adjacent the sides and ends of said header for fusing and flowing the solder into the juncture of the parts of said header, and cooling means for directing currents of relatively cool air against the header adjacent the side and end portions thereof.

5. In a machine for soldering the juncture of component parts of a radiator core header, a frame, a holder mounted thereon, means for moving a radiator core header into position in said holder, adjustable feeding means mounted on said frame for feeding a plurality of strands of wire solder to said machine, a cutter operatively related to said feeding means for severing portions from the respective strands of said wire solder, a plurality of tubular guides operatively related to said cutter for receiving the respective portions of solder cut from said strands and directing said portions by gravity to the respective sides of said header adjacent the juncture of the parts thereof, a plurality of heaters adjacent the sides of said header for fusing and flowing the solder into the juncture of the parts of said header, cooling means for directing currents of relatively cool air against the header adjacent the juncture of the parts thereof, and a timing device operatively related to said heaters and cooling means for regulating and alternately controlling the operation thereof.

6. In a machine for soldering the juncture of component parts of a radiator core header, a frame, a holder mounted thereon, means for moving a radiator core header into said holder, means for feeding pieces of wire solder to the respective sides of said header adjacent the juncture of the parts thereof, a plurality of gas burners and air jets at the respective sides of the header for directing jets of flame and air, respectively, against the juncture of said header parts, supply conduits operatively related, respectively, to said burners and air jets, solenoid valves in the respective conduits for controlling the passage of gas and air, respectively, therethrough, electric circuits operatively related, respectively, to the solenoids of said valves for opening the valves, and a timing device operatively related to said circuits for controlling the operation thereof to alternately open said valves.

MARTIN G. BOERGER.